UNITED STATES PATENT OFFICE 2,460,276

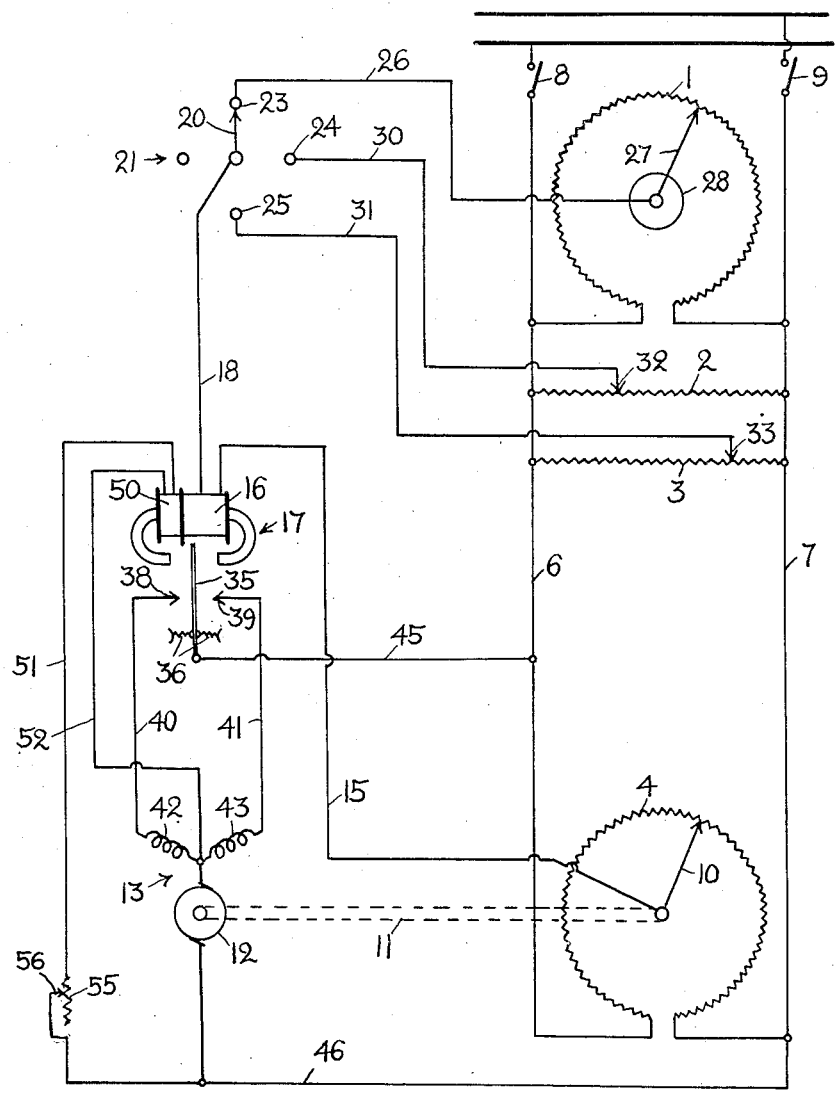

ELECTRIC MOTOR CONTROL APPARATUS WITH AUTOMATIC "Z" EFFECT

Robert Bernas, New York, N. Y., assignor to Michel N. Yardeny, New York, N. Y.

Application October 9, 1945, Serial No. 621,346

5 Claims. (Cl. 318—29)

This invention relates to control apparatus employing a reversible electric motor for operating a load, the motor being controlled by a plurality of position selectors, a suitable switching means being provided for selecting the desired selector.

The main object of this invention is to provide means always to stop the motor after the motor has been rotating in a predetermined direction, thereby substantially eliminating the effect of inaccuracies of the apparatus in its electrical and mechanical component. This object is accomplished according to the invention by providing means to retard the motor rotation in one direction only, and only when the motor approaches its stopping position. When the motor rotates in the non-retarded direction, it is allowed to overrun the stopping position by inertia, causing the control elements to reverse the motor rotation. The motor will then rotate in the retarded direction and cause the load to approach the selected position at a reduced speed. It will be stopped in the exact final position, without any appreciable hunting or oscillations, and with a greater degree of accuracy than would be attainable when the rotation would be equally retarded for both directions of rotation.

These and other objects and advantages of this invention will be evident from the perusal of the accompanying specification and drawing, the single figure of which represents a diagrammatic view of a now preferred embodiment of an apparatus according to the invention.

The apparatus according to this invention, in the embodiment shown on the drawing, comprises a plurality of potentiometers, 1, 2, 3 at a control point, and a potentiometer 4 at a remote point, all connected to a common source of current by leads 6, 7 and switches 8, 9. The potentiometer 4 is engaged by a contact arm 10 mechanically connected by a shaft 11 to the armature 12 of a motor 13. The arm 10 is electrically connected by a lead 15 to one terminal of a coil 16 of a differential relay 17. The other relay terminal is connected by a lead 18 to an arm 20 of a switch 21 having stationary contacts 23, 24, 25. Contact 23 is connected by a lead 26 to a contact arm 27 slidably engaging the potentiometer 1 and manually rotatable by a knob 28. The contacts 24 and 25 are connected by leads 30, 31, respectively, to contacts 32, 33, respectively, engaging the potentiometers 2 and 3 in predetermined or preset positions.

The polarized or differential relay 17 operates an armature 35 normally held in a neutral position as shown by springs 36 and attracted by the relay coil, when energized, in one or the other direction for engaging stationary contacts 38 or 39 connected by leads 40, 41 to reversing motor windings 42, 43. The relay armature 35 is connected by a lead 45 to the supply wire 6. The joined ends of the motor windings are connected to one terminal of the motor armature 12. The other armature terminal is connected by a lead 46 to the supply wire 7.

By placing the switch 21 for instance in a position shown on the drawing the relay 17 will be connected by contact 23 and lead 26 to the contact arm 27, while the fixed contacts 32, 33 are disconnected. The knob 28 can be then turned into any desired position for placing a load in a corresponding position. It is obvious that, if arm 27 is placed in a position to the right or to the left of a position corresponding to the position of the contact arm 10 at the remote point, then arms 27 and 10 will engage points of different potentials on the respective potentiometers 1 and 4 so that current will pass from arm 27 to arm 10 through lead 26, contact 23, switch arm 20, lead 18, relay coil 16, and lead 15. The now energized relay 17 will attract its armature 35 towards one or the other of contacts 38, 39, depending on the direction of the current between the contact arms 27, 10. Hence the motor will be energized through leads 45, 46, one of the contacts 38, 39 and one of the leads 45, 46, one of the contacts 38, 39 and one of the leads 40, 41 through one of the windings 42, 43. The motor will rotate in a direction as determined by the energized winding 42 or 43, until arm 10 is placed in a position corresponding to the position of arm 27, when both arms will engage points of equal potential on the respective potentiometers, and the flow of current between the contact arms 10, 27 will cease. The relay 17 will now be deenergized and the motor be stopped.

In the event it is desired to place the load in one of the predetermined positions, as determined by potentiometers 2 and 3, and the contacts 32, 33, respectively, engaging these potentiometers, switch arm 20 is placed in engagement with contact 24 or 25 depending on the selected position. The contact arm 10 at the remote point will then be placed in a position corresponding to the position of the energized contact 32 or 33 and the operation of motor 13 will be controlled, as has been previously described in connection with the operation of contact arms 10 and 27.

According to the invention, the accuracy in stopping the motor and hence a load operated thereby, is greatly improved by retarding motor rotation before the motor reaches its final stopping position and bringing the motor to a final stop, always after a motor rotation in a predetermined direction, so as to eliminate the effect of inaccuracies or play in mechanical parts and lag in electrical components of the apparatus. For the purpose aforesaid a second coil 50 is provided on the core of the relay 17 which coil is connected by leads 51, 52 to the terminals of the motor armature 12. The supplementary coil 50 is always energized in the same direction by the voltage across the armature terminal when the motor is rotating, while, as previously mentioned, the coil 16 is energized in different directions, so that for one direction of motor rotation the coil 50 supports the action of coil 16 and for the other direction of rotation the coil 50 opposes the action of coil 16. In the latter case, relay 17 is deenergized sufficiently to release armature 35 in advance of the contact arm 10 reaching its neutralizing or no-current position corresponding to the position of the arm 27, thereby interrupting the motor circuit. As a result, motor 13 can approach the stopping position by inertia only, so that it will be stopped before contact arm 10 rotated by motor 13 is moved by inertia into a position in which the relay current will be reversed, thereby causing motor rotation in reversed direction. Such a reversal will take place, however, when the motor rotates in the other direction (coil 50 then supporting coil 16), so that the final stopping always occurs when the motor approaches the stopping position in a certain predetermined direction. The energization of opposing relay coil 50 will of course disappear when the motor 13 stops. It should be noted that the strength of the demagnetizing action of coil 50 depends on the speed of the motor and is greater at higher speed, so that the coil at higher motor speeds will cut off the relay earlier, thus giving more time for the inertia of the motor to be dissipated. Hence the varying effect of inertia is automatically compensated.

For adjusting the action of the coil 50, a rheostat 55 with an adjustable contact arm 56 may be provided in the coil circuit.

I claim:

1. An electrical remote control apparatus for placing a load in a selected position, comprising a load motor for operating the load; a transmitter and a receiver, each comprising two control members, one of the members being movable and operatively connected with the load motor; circuit means including the transmitter and receiver; a relay means included in said circuit for energizing the motor for causing the movable member of the receiver to be placed in a position corresponding to the position of one of the control members of the transmitter, the said position being a deenergizing position for the relay means; and a second circuit means connecting the relay means with the motor armature for deenergizing the relay means, thereby deenergizing the motor in advance of the movable element reaching the said deenergizing position when the motor rotates in a predetermined direction and for maintaining the relay means energized when the motor rotates in the opposite direction, thereby causing the motor to be stopped always after rotation in the predetermined direction.

2. An electrical remote control apparatus for placing a load in a selected position comprising a load motor for operating the load; a transmitter and a receiver each comprising two control members, one of the members of the receiver being movable and operatively connected with the load motor; circuit means including the transmitter and the receiver; a relay means having a coil included in said circuit for energizing the motor for causing the movable member of the receiver to be placed in a position corresponding to the position of one of the control members of the transmitter, the said position being a substantially no-current position for the relay means; a second relay coil included in a second circuit; and means connecting the second relay coil with the motor armature for deenergizing the relay, thereby deenergizing the motor in advance of the movable element reaching the said no-current position when the motor rotates in a predetermined direction and for maintaining the relay means energized when the motor rotates in the opposite direction, thereby causing the motor to be stopped always after rotation in the predetermined direction.

3. An electrical remote control apparatus as described in claim 2, wherein said second relay coil is connected in parallel with the motor armature.

4. An electrical remote control apparatus for placing a load in a selected position comprising a load motor for operating the load; a transmitter and a receiver electrically connected together, each comprising two control members, one of the members of the receiver being movable and operatively connected with the load motor; circuit means including the transmitter and the receiver; a differential relay having two coils, one of said coils included in said circuit for controlling directional rotation of the motor for causing the movable member of the receiver to be placed in a position corresponding to the position of one of the control members of the transmitter, the said position being a substantially no-current position for the relay; and a second circuit connecting the second relay coil in parallel with the motor armature for deenergizing the relay, thereby deenergizing the motor, in advance of the movable element reaching the said no-current position when the motor rotates in a predetermined direction and for maintaining the relay energized when the motor rotates in the opposite direction, thereby causing the motor to be stopped always after rotation in the predetermined direction.

5. An electrical remote control apparatus as described in claim 4, wherein one of the members comprises a resistance element and the other a contact element engaging the resistance element.

ROBERT BERNAS.

REFERENCES CITED

The following references are of record in the file of this patent:

UNITED STATES PATENTS

| Number | Name | Date |
|---|---|---|
| 1,800,328 | Sundhaussen | Apr. 14, 1931 |

FOREIGN PATENTS

| Number | Country | Date |
|---|---|---|
| 246,573 | Great Britain | Jan. 29, 1926 |